(12) United States Patent
DeFlumere

(10) Patent No.: US 6,864,965 B2
(45) Date of Patent: Mar. 8, 2005

(54) DUAL-MODE FOCAL PLANE ARRAY FOR MISSILE SEEKERS

(75) Inventor: Michael E. DeFlumere, Winchester, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/334,826

(22) Filed: Dec. 31, 2002

(65) Prior Publication Data

US 2004/0004707 A1 Jan. 8, 2004

Related U.S. Application Data

(60) Provisional application No. 60/363,601, filed on Mar. 12, 2002.

(51) Int. Cl.$^7$ ............................ G01C 3/08; G01B 11/26
(52) U.S. Cl. .................................. 356/4.01; 356/141.1
(58) Field of Search ............................ 356/4.01, 141.1; 244/3.13, 3.16; 250/342, 203.2, 203.6

(56) References Cited

U.S. PATENT DOCUMENTS

| | | | |
|---|---|---|---|
| 4,290,844 A | | 9/1981 | Rotolante |
| 4,383,663 A | * | 5/1983 | Nichols ...................... 244/3.16 |
| 4,527,183 A | | 7/1985 | Anthony |
| 4,595,428 A | | 6/1986 | Anthony |
| 4,597,002 A | | 6/1986 | Anthony |
| 4,956,686 A | | 9/1990 | Borrello |
| 5,300,780 A | | 4/1994 | Denney |
| 5,300,786 A | | 4/1994 | Brunner |
| 5,318,666 A | | 6/1994 | Elkind |
| 5,446,529 A | * | 8/1995 | Stettner et al. ............ 356/4.01 |
| 5,547,331 A | | 8/1996 | Podd |
| 5,599,733 A | | 2/1997 | Wan |
| 5,798,519 A | | 8/1998 | Vock |
| 5,835,204 A | * | 11/1998 | Urbach ....................... 356/5.01 |
| 5,892,575 A | * | 4/1999 | Marino ...................... 356/5.01 |
| 5,960,097 A | | 9/1999 | Pfeiffer |
| 6,180,945 B1 | | 1/2001 | Barton |
| 6,323,941 B1 | * | 11/2001 | Evans et al. ................ 356/4.01 |
| 6,329,649 B1 | | 12/2001 | Jack |
| 6,369,885 B1 | * | 4/2002 | Brown et al. .......... 356/139.04 |
| 6,674,520 B2 | * | 1/2004 | Hicks et al. ........... 356/139.04 |

\* cited by examiner

Primary Examiner—Bernarr E. Gregory
Assistant Examiner—Brian Andrea
(74) Attorney, Agent, or Firm—Daniel J. Long

(57) ABSTRACT

A single dual mode monolithic focal plane array having an active sensor and a passive sensing capability is switched from one mode to the other by switching the bias across the cells of the array from a passive IR mode to an active LADAR mode, with the monolithic dual mode focal plane array having applications in missile target seekers and laser target designators. The switching is accomplished by increasing the gain of the array by as much as 30 times that associated with IR detection when laser return pulses are expected. Thus, there need be no mechanical changes to the array to afford both passive IR sensing and an active LADAR pulse detector. Nor need there be two different focal plane arrays, one for IR and one for laser radiation, which leads to boresighted alignment problems.

12 Claims, 5 Drawing Sheets

DUAL-MODE FOCAL PLANE ARRAY FOR MISSILE SEEKERS

CROSS REFERENCE TO RELATED APPLICATION

This application claims rights under U.S. Provisional Application Ser. No. 60/363,601; filed Mar. 12, 2002.

FIELD OF INVENTION

This invention relates to focal plane arrays used in missile interceptors and more particularly to a dual mode monolithic focal plane array.

BACKGROUND OF THE INVENTION

Target seeking by missile interceptors can be done several ways. The most common approach uses ground-based radar for coarse guidance, then an infrared (IR) seeker for terminal guidance. IR seekers come in two varieties: passive and active. Passive sensors work with a two dimensional image and rely on the heat given off by the target for identification and tracking. This can be very effective but is subject to noise, clutter and countermeasures such as decoys. The second method uses a laser on the interceptor to scan the target. This method is very effective at shorter ranges but not suitable for acquiring targets at long distances or for scanning large volumes of space for initial target acquisition. The three dimensional (3-D) imaging capability and the single wavelength of active sensors makes them very effective for distinguishing targets from decoys and cutting through natural clutter and thermal noise. An ideal solution would be to have both systems onboard: passive for mid-range target acquisition and active laser for terminal guidance and defeat of noise, clutter and countermeasures. In the past this has not been achieved because of the cost and the limited space available, weight constraints and the limited power available in most interceptors to implement two separate systems. To date no effective technology is available to make a single focal plane array suitable for both passive and active IR seekers.

As illustrated in U.S. Pat. No. 5,300,780 multispectral image analysis is used to separate a missile or target reentry vehicle from background. The multispectral performance is obtained by mounting filters on a color wheel in front of a focal plane array.

Note that a two color infrared focal plane array for multiple IR bands is described in U.S. Pat. No. 4,956,686 in which infrared detectors of two sensitivity types are shown.

Also known are various ways of making infrared HgCdTe arrays such as described in U.S. Pat. Nos. 5,318,666; 5,599,733; and 6,180,945. U.S. Pat. No. 6,329,649 describes the combination of linear and two-dimensional arrays of IR sensors along with an associated silicon readout integrated circuit (ROIC) substrate for the array.

U.S. Patents describing methods of making radiation detecting arrays include U.S. Pat. Nos. 4,527,183; 4,290,844; 4,595,428; 4,597,002 and 5,300,786.

Finally U.S. Pat. No. 5,960,097 describes a missile and tracking system operating on data samples from a focal plane array of an electro-optical sensor.

Note that the above multispectral systems do not envision using a single monolithic device to passively detect both IR and returned laser pulses from a LADAR device.

SUMMARY OF THE INVENTION

The above implementation hurdles can be overcome by using a single dual-mode focal plane array (FPA) for both active and passive seeking. Such a solution provides both passive and active capability in one unit at a smaller cost than two individual systems and with no increase in power/weight/volume requirements.

In order to be able to take advantage of both IR radiation from a target and to obtain precise information about a target using LADAR pulses, in the subject invention a single monolithic focal plane array is made to respond alternatively to passive detection of IR and returned laser pulses by increasing the bias across each of the pixels or cells making up the array during the time interval that laser returns are expected. In one embodiment, an HgCdTe cell is used in which the gain of the device is multiplied by 30 via the increase of a bias voltage to alter the normal IR response of the device to detect laser pulses. By so doing, a monolithic dual mode device is achieved such that the device can be switched between passive IR and active laser pulse detection modes. What this means is that one focal plane array can function for two purposes. Since the detector cells are the same for both modes there are no alignment problems that are associated with using two focal plane arrays, one for passive IR detection and the second for the LADAR. Since the two devices are in fact one, the two devices are properly characterized as being co-boresighted. Note that LADAR pulses are in the $1\mu$–$10\mu$ range, whereas passive IR is in the $1$–$3\mu$, or $3$–$5\mu$ range.

As will be appreciated, many system applications require both a passive IR and active laser sensing capability. Seekers used by interceptors and other missiles to acquire targets are of special interest to many users of weapon control systems. In general, the passive IR sensor has wider field of view (FOV) than the active laser sensor and is used for acquisition Active sensors use a smaller field of view to keep the laser transmitter power, size and weight manageable. Implementing both active and passive systems in a single missile is not always practical. Focal plane arrays tend to be one of the major cost drivers for Electro Optical sensors and using two such arrays is often times impractical if not impossible. Implementation of both active and passive sensors on one focal plane array permits their use in a missile sometimes called a kill vehicle, and reduces the cost and size/weight/power factors which would usually inhibit such a solution. Such an adaptation makes a common aperture approach cost effective and practical to implement and makes boresight problems associated with multiple focal plane arrays a non-issue.

In summary, a single dual mode monolithic focal plane array having an active sensor and a passive sensing capability is switched from one mode to the other by switching the bias across the cells of the array from a passive IR mode to an active LADAR mode, with the monolithic dual mode focal plane array having applications in missile target seekers and laser target designators. The switching is accomplished by increasing the gain of the array by as much as 30 times that associated with IR detection when laser return pulses are expected. Thus, there need be no mechanical changes to the array to afford both passive IR sensing and an active LADAR pulse detector. Nor need there be two different focal plane arrays, one for IR and one for laser radiation, which leads to boresighted alignment problems.

BRIEF DESCRIPTION OF THE DRAWINGS

These and other features of the subject invention will be better understood with connection with the Detailed Description in conjunction with the Drawings, of which.

DETAILED DESCRIPTION

Figure 1:
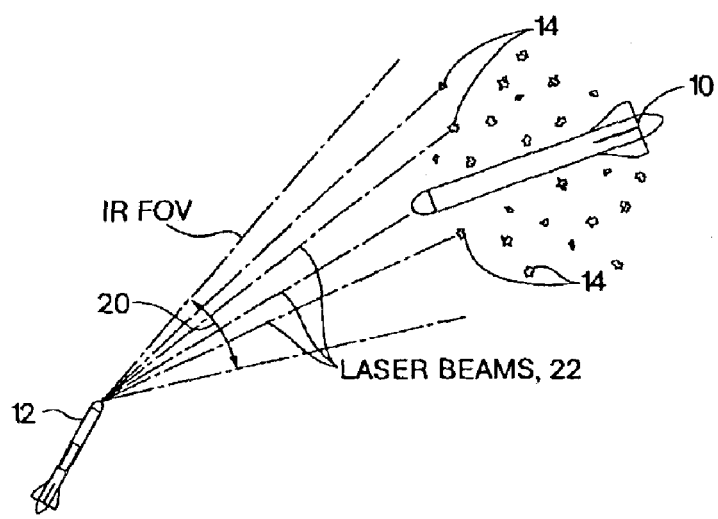
FIG. 1 is a diagrammatic illustration of a tactical missile intercept of a reentry vehicle in which the kill vehicle carries a dual mode IR and LADAR focal plane array that is switchable between the two modes by the selective application of different bias voltages.

Referring now to FIG. 1, an intercept scenario is depicted in which a reentry vehicle 10 is being pursued by kill vehicle 12 which is to intercept the reentry vehicle along its trajectory. Reentry vehicle 10 deploys numerous decoys 14 to be able to prevent the kill vehicle from intercepting the reentry vehicle.

In order to ascertain the whereabouts of the reentry vehicle, infrared radiation from the reentry vehicle is sensed in a cone 20 which represents the field of view for the passive IR detector on the kill vehicle. Upon sensing of a target cloud including the reentry vehicle and decoys, the seeker is switched from a passive IR mode to an active LADAR mode in which steered laser beams 22 are directed towards the target cloud in order to be able to accurately characterize the type of target intercepted by the LADAR beam and to be able to ascertain the characteristics and track of each of the targets intercepted by the beams.

Figure 2:
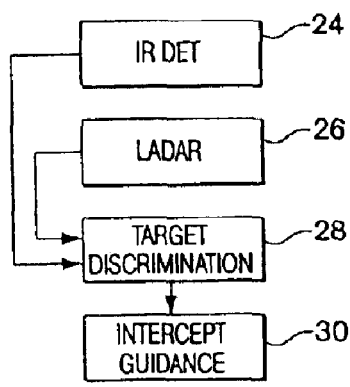
FIG. 2 is a block diagram of the IR and LADAR detectors used in the seeker of the kill vehicle of FIG. 1 in which the seekers are coupled to a target discrimination unit in turn coupled to an intercept guidance module.

Referring to FIG. 2, the seeker on board kill vehicle 12 includes a passive IR detector 24 and a LADAR unit 26, the outputs of which are coupled to a target discrimination unit 28 which determines which of the targets intercepted are decoys and which is the real reentry vehicle. Upon ascertaining which of the targets is the true reentry vehicle, intercept guidance 30 guides the kill vehicle for an intercept with reentry vehicle 10.

While in the past separate passive IR detectors and active LADAR detectors have been utilized, in the subject invention a single focal point array 40 includes a number of cells 42 each of which is read-out by a read-out integrated circuit 44.

The mode in which the array is operating is controlled by a bias controlled circuit 46 which increases the bias across all of the cells in the array to change the characteristics of the array from an original passive IR detection array to an active LADAR return pulse detector. In order to establish when the bias control is to increase the gain of the individual cells of the array in response to expected returned LADAR pulses, an initial range determination is made at 48 so that a calculation can be made as to when the expected returns will arrive at the focal plane array. Bias control circuit 46 is also provided with an indication of when the laser pulses are transmitted by laser transmitter 50 which emits pulses at a predetermined pulse repetition rate or PRF 52.

Figure 3:
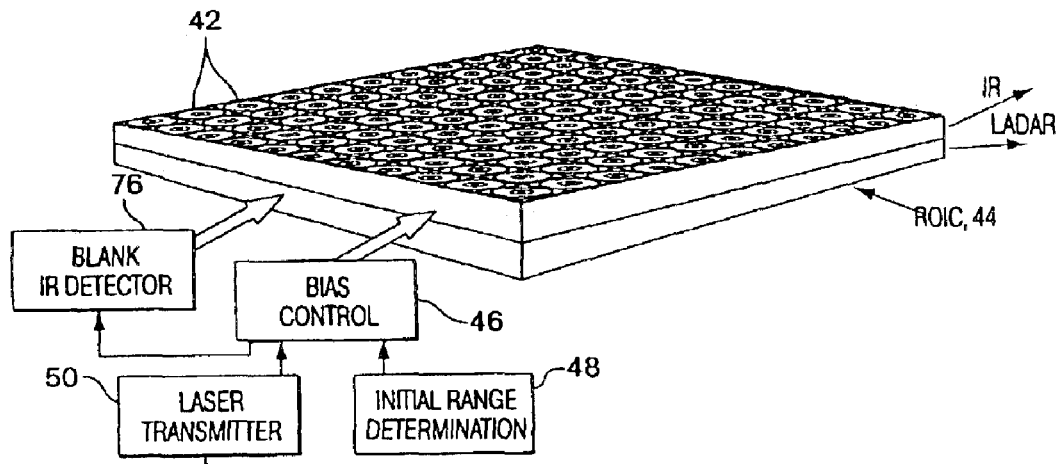
FIG. 3 is a diagrammatic representation of the subject dual mode focal plane array which is switchable from one mode to the other by the applications of the appropriate bias voltage.
Figure 4:
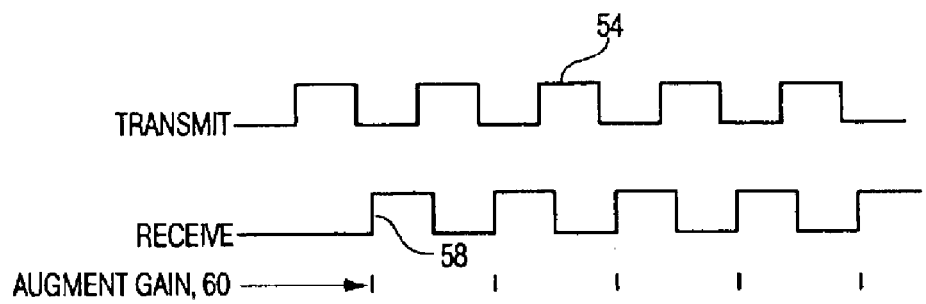
FIG. 4 is a waveform diagram of transmitted and received LADAR pulses, with gain augmentation commenced at the expected arrival time of returned LADAR pulses.

Referring to FIG. 4, if the LADAR pulses shown by waveform diagram 54 are as illustrated, and assuming that the received return pulses are as indicated by waveform 56, then it can be seen that the leading edges 58 of the returned pulses are the points at which the gain if the focal plane array 40 of FIG. 3 is to be augmented, in some instances by increasing the bias voltage by 30 times the passive IR voltage.

Here, as can be seen, the bias voltage is to be increased at as illustrated at 60 so that the focal plane array is switched from its passive to active mode at the precise time that LADAR pulses are expected to be returned.

It is the finding of the subject invention that by increasing the gain of the array, the array can be made to respond to the returned LADAR pulses which otherwise it would be unable to detect. The increasing of the gain by as much as 30 times that associated with passive IR mode causes the return or reflected LADAR pulses to be detected in the selfsame array that is utilized to detect the passive infrared image of the target.

Figure 5:
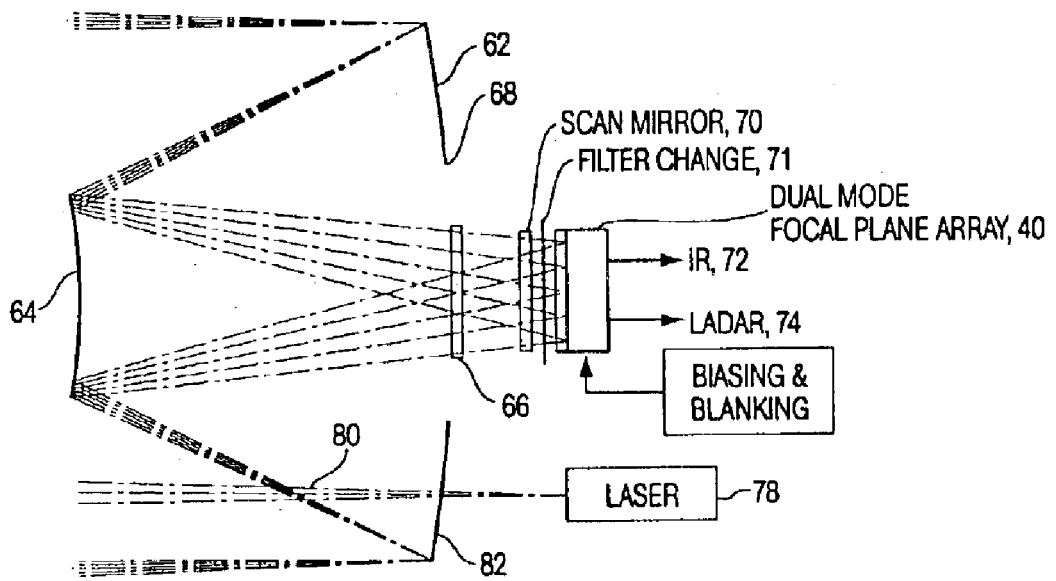
FIG. 5 is a diagrammatic representation of a single dual mode monolithic focal plane array at the focal plane of seeker optics indicating a scanning mirror for both laser and IR sweeping, along with an optional filter change module for use when receiving either IR or laser radiation to achieve improved performance.

Referring now to FIG. 5, in one embodiment a dual mode focal plane array 40 is positioned so as to receive incoming radiation reflected by a mirror 62 to another focusing mirror 64 in a cassagrain type arrangement in which a further lens 66 is positioned at the aperture 68 of mirror 62. A scan mirror 70 is positioned between lens 66 and focal plane array 40 so as to simultaneously scan the optical axis of the passive IR detector and the active LADAR detector so that regardless of the mode that the dual focal plane array is operated, it will be looking at exactly the same point of space.

Depending on the mode of operation, either passive IR as illustrated at 72 is outputted or the result of the LADAR pulses here illustrated at 74 is outputted. Also, as illustrated at 71 a removable filter may optionally be employed to block out unwanted returns from the opposite mode.

Referring back to FIG. 3, it will be appreciated that in whatever mode the focal plane array is operated, the opposite mode may be blanked so as to make it unresponsive to unintended detection of radiation. For instances, as illustrated at 76 a unit is coupled to the focal plane array to blank the output of the array for passive detection when the bias control unit places the array in the active LADAR detection mode. Likewise, the active LADAR detection mode may be blanked when passively searching for an IR image.

Referring now to FIG. 5, a LADAR laser 78 may be utilized to project laser radiation out through the focusing optics associated with the dual mode focal plane array through the introduction of the laser beam 80 through an aperture 82 in mirror 62.

Alternatively, although not shown, laser beam 80 may be projected up and along the same axis as the optical axis of the dual mode focal plane array 40 so that the laser beam is boresighted with the optical axis of the focal plane array.

Figure 6:
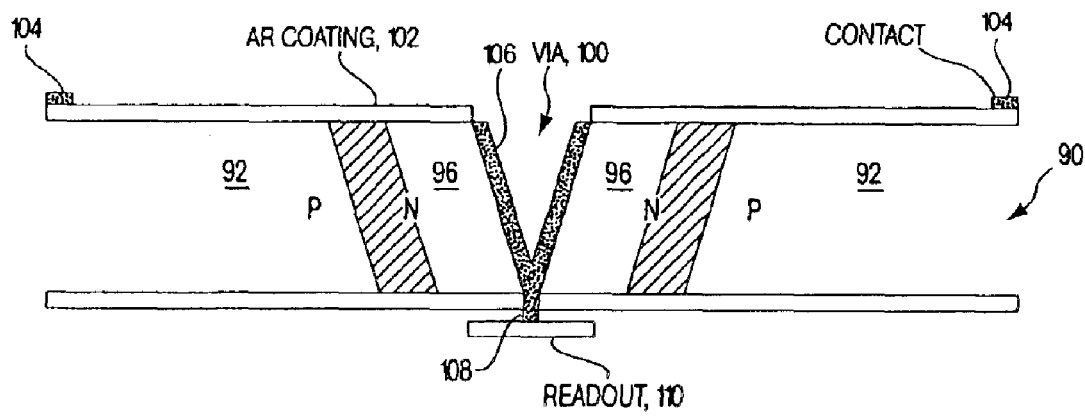
FIG. 6 is a cross sectional view of one cell of the subject dual mode focal plane array which comprises one pixel.

Referring now to FIG. 6, in one embodiment a cell 90 of array 40 of FIG. 1 is illustrated in which each cell is made up of a p-doped region 92 which is in ohmic contact with N/N+ region 96, with a via 100 existing at the central region of the cell. An anti-reflective coating 102 is applied across the top of the cell, with a first biasing pad 104 contacting the periphery of the cell. A conductive layer 106 is in contact with the N/N+ regions and descends downwardly to a pad 108 at which read-out integrated circuit 110 is used to probe the array for the results of the detection in either one of the two modes.

Figure 7:
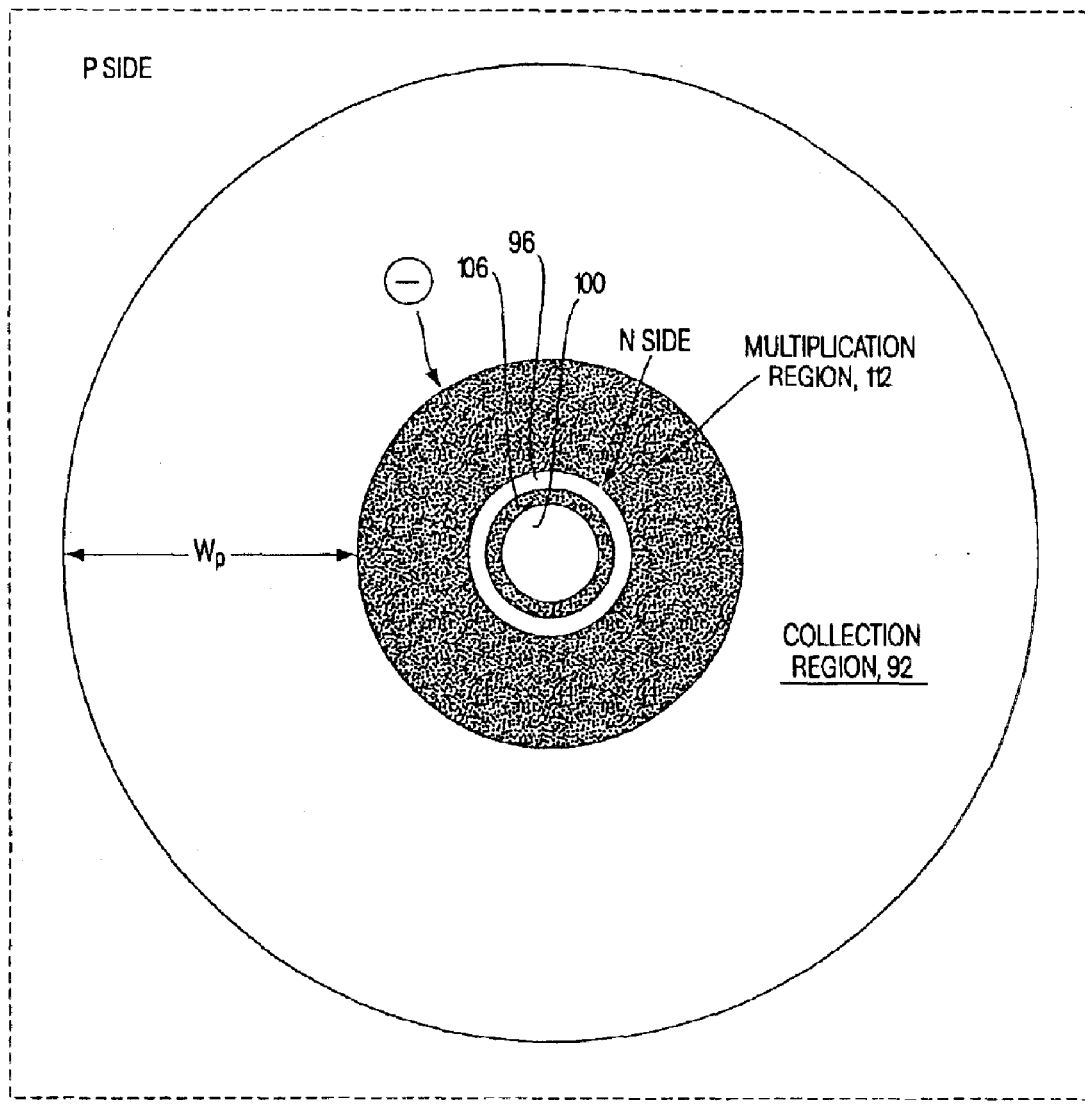
FIG. 7 is a top view of the cell of FIG. 6.

Referring now to FIG. 7, via 100 is illustrated as being central to a circular region in which conductive layer 106 is shown to be visible. Exterior of the conductive layer is an N/N+ region 96, with p-type region 92 being the collective region illustrated. There is however, a multiplication region 112 at which the avalanche diode operation exists.

Figure 8:
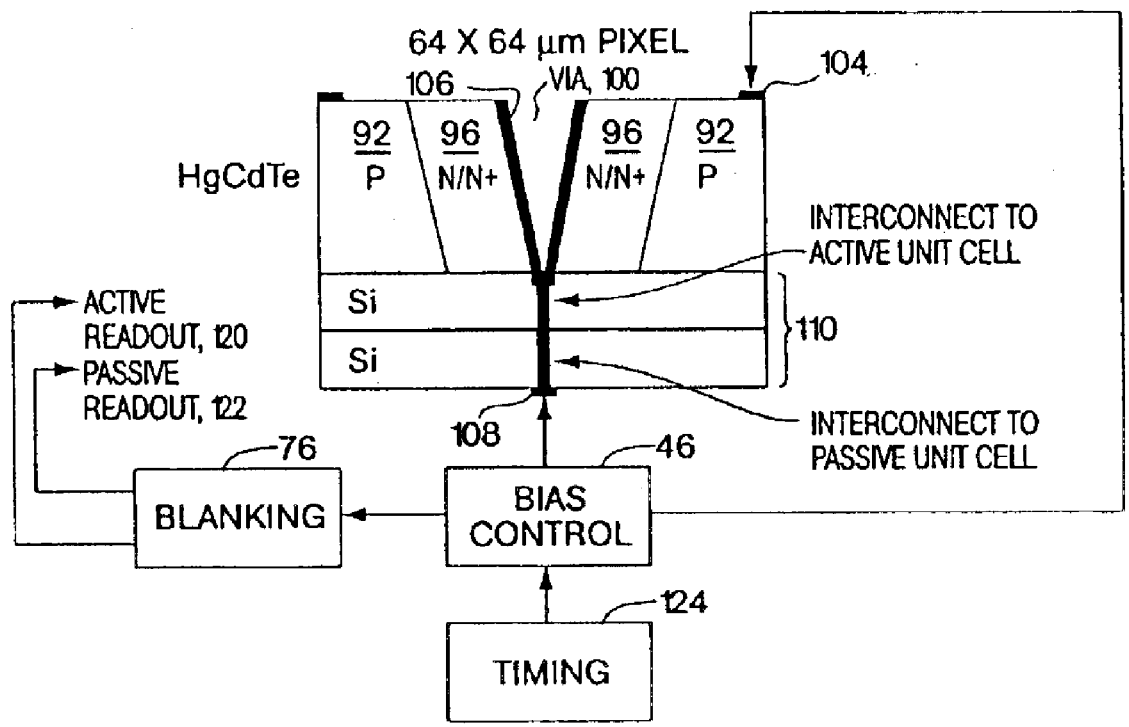
FIG. 8 is a diagrammatic representation of the cell of FIG. 6 showing biasing and blanking circuits used to switch the modes of the focal plane array.

Referring now to FIG. 8, a more detailed view of the pixel cell is illustrated in which like elements have like reference characters. Here it can be seen that ROIC 110 may include a pair of silicon layers, one embodying the active read-out 120 and the other embodying the passive read-out 122. Read-out layer 120 is used to connect the active cell output to the outside world, whereas read-out 122 is used to connect the passive IR component of the cell to the outside world.

Bias control unit 46 is utilized to bias each of the cells by applying a bias voltage across contacts 104 and 108, with bias control being provided by a timing unit 124 for controlling the timing of the application of the bias to each cell. Blanking unit 76 of FIG. 3 is used to alternatively blank the active read-out or the passive read-out of the device.

Figure 9:
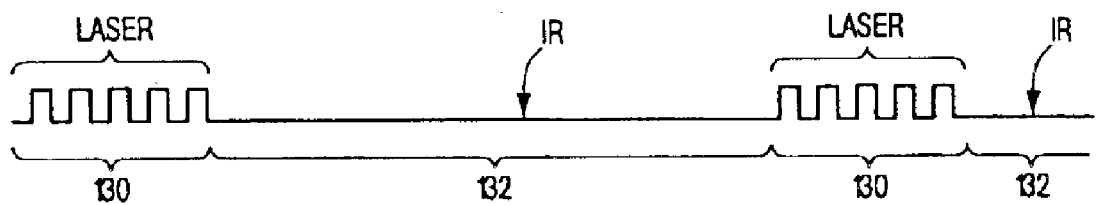
FIG. 9 is a waveform diagram illustrating LADAR pulse bursts in which the mode of the cell of FIG. 8 is switched to high gain for receipt of returned laser pulses and to low gain for passivity detecting IR radiation between the bursts; and, FIG. 10 is a diagrammatic representation of a laser illuminator scenario in which the laser scintillation problem is resolved with the use of passive IR detection.

In operation, referring now to FIG. 9, a series of returned laser pulses here illustrated at 130 arrive at the times indicated, whereas the remainder of the time as illustrated at 132 is used for collecting infrared radiation for passive sensing.

Thus, in one mode of operation a burst of LADAR pulses is projected towards a target cloud interspersed with LADAR silence. The silence is used to collect infrared images from infrared radiation from the target area.

In so doing, the same monolithic focal plane array is utilized for both active and passive IR detection, with the two detection mechanisms being such that since they share the same geometry and are thus co-boresighted. This eliminates problems of alignment of two focal plane arrays should such, be utilized for seeking, laser range finder or target designation purposes.

Figure 10:
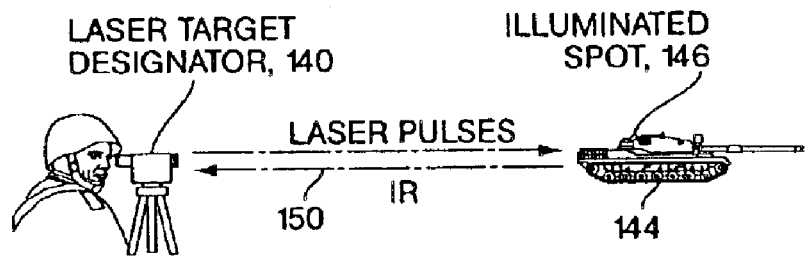

Referring to FIG. 10, another application for the subject dual mode focal plane array is when utilizing a laser target designator as illustrated at 140. Here laser pulses 142 are projected towards a target 144, in this case a tank, and more specifically to attempt to illuminate a spot 146 on the tank's turret, the most vulnerable part of the tank. Also infrared radiation is emitted from the tank as illustrated at 150 which is detected by the laser target designator for purposes that will become clear hereinafter.

Figure 11:
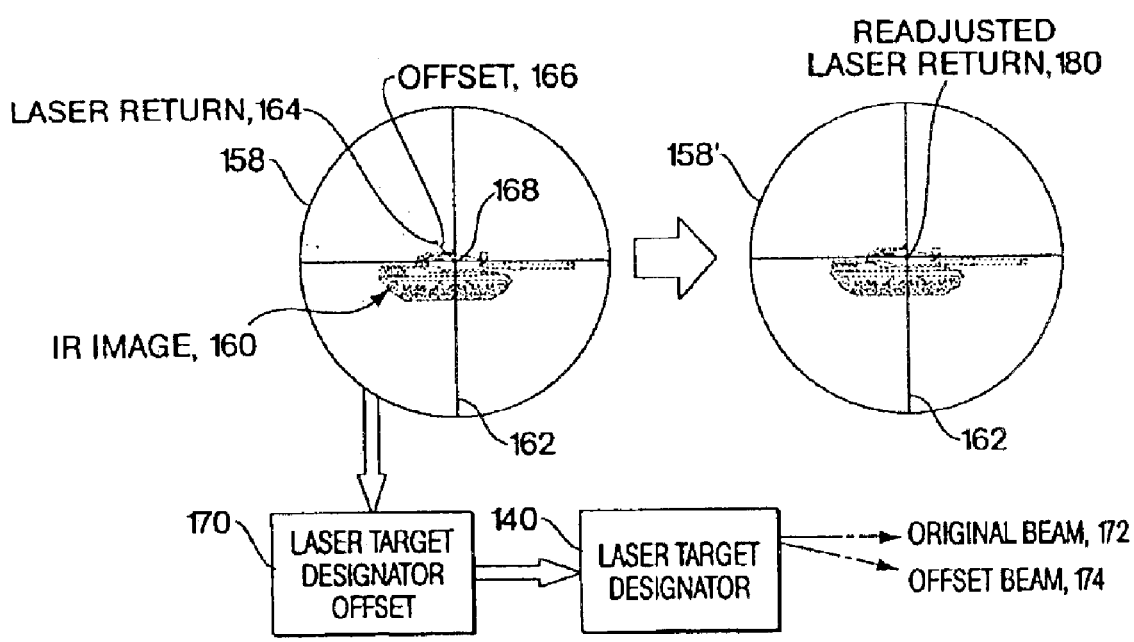

Referring to FIG. 11, an IR image 160 of tank 144 in FIG. 10 is illustrated as being centered on the crosshairs 162 of the laser target designator. However, it will be seen that the laser return 164 is offset as shown at 166 from the actual crosshairs of the laser target designator.

The result of the return offset is due to scintillation or other atmospheric effects which in essence cause the return of the laser radiation to appear to dance about the scope. It will be appreciated that even though the crosshairs are on the IR image of the tank, it is not clear that the actual LADAR pulse which is projected towards the tank in fact is at the turret as would be indicated by merely relying on the crosshairs. Assuming that one utilizes the subject dual focal plane array, by merely driving the detected laser return towards the crosshairs as illustrated by arrow 168, a laser target designator offset as illustrated at 170 can be established which in turn redirects the projected pulse laser beam 172 as illustrated by offset laser beam 174 through the control of the internal operation of the laser target designator 140. The result as illustrated at display 158' is the readjusted laser return 180 is now directly at the crosshairs 162 of the display 158'.

Thus when aiming the laser target designator at a particular target, one can be assured through the closed loop offset control that the particular portion of the target desired to be illuminated will in fact be illuminated.

Through the use of the dual mode focal plane array in which there are no alignment errors, it can be seen that whether used with a seeker or used in a laser target designator, the subject monolithic dual mode focal plane array provides instant alignment capability, and drops the need for having two different focal plane arrays.

In one embodiment, a mercury-cadmium, telluride array is used. This may be of the type described in U.S. Pat. No. 5,318,666.

The subject dual mode focal plane concept uses the same Mercury-Cadmium-Telluride (HgCdTe) Active Pixel Diodes (APD) for both passive imaging and active 3D imaging. This approach requires the HgCdTe APD diodes to be sensitive to the 1–5 $\mu$m wavelength band for useful active/passive applications. As noted above, in one embodiment the gain is switched from unity for the passive mode to a higher gain, typically ~30 for the active mode.

The Read Out Integrated Circuit (ROIC) is in two levels of silicon, one for the passive mode and one for active mode. Switching within the ROIC would steer the active pixel diode signal to either the passive or active layer. This approach needs to be traded off with a common ROIC with a configurable front end that cycles between passive and active. The active and passive focal plane arrays need not be the same size, the active would be the smaller of the two, or could be if the system application required it. The device can be designed to operate over the 1–2 micron laser range and the Medium Wave IR (MWIR) band. Under high background noise conditions the system may require that a narrow band pass filter be inserted at the time the laser measurement is made.

The unit cell uses a cylindrical APD structure. Via interconnects are used to connect both the active and passive layers in the silicon, was there being only one layer in the HgCdTe.

The bandwidth requirements of the active system drive the HgCdTe unit cell to be made from a number of smaller unit cells.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. Apparatus for passively detecting infrared radiation from a target and for detecting laser pulses returned by said target as a result of the illumination of said target by a LADAR unit, comprising:

a single dual mode monolithic focal plane array; and, a biasing circuit coupled to said array for biasing said array so passively detect infrared radiation impinging on a surface of said array, and for increasing the bias voltage on said array sufficient to be able to detect returned laser pulses, whereby a single device performs passive and active detection functions.

2. The apparatus of claim 1, and further including a circuit for selectively blanking the passive detection output of said array when said array is biased for detection of said laser pulses.

3. The apparatus of claim 1, and further including a circuit for selectively blanking the detection of laser pulses when said array is biased for passive detection.

4. The apparatus of claim 1, wherein said biasing circuit selectively biases said array to increase the gain thereof 30 times that associated with passive detection, thus to permit detection of returned laser pulses.

5. The apparatus of claim 1, wherein said array includes an array of cells and wherein each of said cells includes an active pixel diode.

6. The apparatus of claim 5, wherein each of said cells includes an HgCdTe structure.

7. The apparatus of claim 1 and further including a read-out integrated circuit coupled to said array for the read-out of passively detected infrared radiation.

8. The apparatus of claim 1 and further including a read-out integrated circuit coupled to said array for the read-out of returned laser pulses.

9. A target seeker for a missile comprising a single co-boresighted focal plane array functioning in two modes to selectively passively detect infrared radiation and actively detect returned laser pulses, wherein said focal plane array is a single monolithic device, whereby for whatever detection mode the focal plane array has a common optical axis, and the mode of said array is determined by the biasing thereof, and said array includes HgCdTe regions, and said seeker includes a LADAR unit and wherein laser pulses returned from a target illuminated by said LADAR unit have an expected arrival time and further including a bias switching circuit for switching said array from a passive infrared radiation detection mode to a mode for detecting returned laser pulses when said returned laser pulses are expected.

10. A method of eliminating the requirement for two focal plane arrays for active and passive detection of returned laser pulses and incoming infrared radiation, comprising the steps of:

providing a single monolithic focal plane array, and, biasing the array to selectively be responsive to the incoming infrared radiation and returned laser pulses, wherein the array is a mercury-cadmium-telluride active pixel diode array and wherein the biasing increases the gain of the array when returned laser pulses are expected.

11. The method of claim 10, wherein the gain increase caused by increased bias voltage for detection of returned laser pulses is on the order of 30 times that associated with passive infrared sensing.

12. The method of claim 10, wherein both passive and active detection functions of the array are performed by one device, such that no boresighting problem exists.

* * * * *